United States Patent [19]

Olshansky

[11] 4,351,658

[45] Sep. 28, 1982

[54] MANUFACTURE OF OPTICAL FIBERS

[75] Inventor: Robert Olshansky, Natick, Mass.

[73] Assignee: Corning Glass Works, Corning, N.Y.

[21] Appl. No.: 215,574

[22] Filed: Dec. 12, 1980

[51] Int. Cl.³ .................... C03B 37/075; C03C 25/02
[52] U.S. Cl. ........................................ 65/3.12; 65/3.13;
65/3.2; 65/13
[58] Field of Search .................. 65/3.12, 3.13, 3.2,
65/13, 3.11; 427/163; 350/96.33

[56] References Cited

U.S. PATENT DOCUMENTS

| | | | |
|---|---|---|---|
| 4,145,200 | 3/1979 | Yamazaki et al. | 65/3.13 |
| 4,197,136 | 4/1980 | Inoue et al. | 65/3.12 |
| 4,199,337 | 4/1980 | Asam | 65/3.12 |
| 4,249,925 | 2/1981 | Kawashima et al. | 65/3.12 |

FOREIGN PATENT DOCUMENTS 1134466 11/1968 United Kingdom.
2023127 12/1979 United Kingdom.
1558550 1/1980 United Kingdom.

*Primary Examiner*—Richard V. Fisher
*Attorney, Agent, or Firm*—William J. Simmons, Jr.

[57] ABSTRACT

A method of inexpensively forming low-loss optical waveguide fibers having high strength. A draw blank comprising a core region surrounded by a thin layer of cladding glass is formed by a CVD technique. The blank is drawn into a preliminary fiber which passes through a double crucible arrangement whereby a tension layer is applied to the thin coating layer of the preliminary fiber and a compression layer is formed on the surface of the tension layer. The expansion coefficient of the tension layer is much greater than that of the core glass, and the expansion coefficient of the compression layer is lower than that of the tension layer.

6 Claims, 3 Drawing Figures

4,351,658

MANUFACTURE OF OPTICAL FIBERS

BACKGROUND OF THE INVENTION

The present invention relates to the manufacture of optical waveguide fibers.

Optical waveguide fibers have been greatly improved during the last decade until attenuations less than 1.0 dB/km have been routinely achieved. Such low loss fibers are formed by a chemical vapor deposition technique (CVD) which results in the formation of extremely pure materials. In accordance with this technique, optical waveguide preforms can be formed by depositing glass layers on the outside surface of a temporary mandrel or on the inside surface of a tube which later forms at least a portion of the cladding material. These two embodiments of the CVD technique will be briefly described below.

In one embodiment of the CVD process the vapor of reactant compounds is introduced into a flame where it is oxidized to form a glass soot which is directed toward a mandrel. This so-called flame hydrolysis method of formng coatings of glass soot is described in greater detail in U.S. Pat. Nos. 3,737,292; 3,823,995; 3,884,550; 3,957,474 and 4,135,901. To form a step-index optical waveguide fiber, a second coating having a lower refractive index than the first is applied over the outside peripheral surface of the first coating. To form a gradient index fiber, a plurality of layers of glass soot are applied to the starting member, each layer having a progressively lower index of refraction as taught in U.S. Pat. No. 3,823,995. Gradient index fibers may also be provided with a coating of cladding material. After the plurality of coatings are formed on the mandrel, the mandrel is removed and the resultant tubular preform is gradually inserted into a consolidation furnace, the temperature of which is sufficiently high to fuse the particles of glass soot and thereby consolidate the soot preform into a dense glass body in which no particle boundaries exist. The resultant consolidated blank is drawn into an optical waveguide fiber.

In accordance with a second embodiment of the CVD technique the reactant vapor, together with an oxidizing medium, flow through a hollow, cylindrical substrate. The substrate and the contained vapor mixture are heated by a source that moves relative to the substrate in a longitudinal direction, whereby a moving hot zone is established within the substrate tube. A suspension of particulate material which is produced within the hot zone travels downstream where at least a portion thereof comes to rest on the inner surface of the substrate where it is fused to form a continuous glassy deposit. After suitable layers have been deposited to serve as the cladding and/or core material of the resultant optical waveguide fiber, the temperature of the glass tube is generally increased to cause the tube to collapse. The resultant draw blank is then drawn in accordance with well known techniques to form an optical waveguide fiber having the desired diameter. Such process parameters as temperatures, flow rates, reactants and the like are discussed in the publications: J. B. MacChesney et al., Proceedings of the IEEE, 1280 (1974) and W. G. French et al., Applied Optics, 15 (1976). Reference is also made to the text *Vapor Deposition* edited by C. F. Powell et al., John Wiley & Sons, inc. (1966).

Although the CVD technique of forming optical waveguide preforms results in the formations of optical waveguide fibers having extremely low attenuation, this method is also relatively expensive. For this reason research is being conducted on other fiber manufacturing techniques. The double-crucible process is widely recognized to be a low-cost process for making optical waveguides. While improvements have been made in both the composition of double-crucible fibers and apparatus for making such fibers as evidenced by U.S. Pat. Nos. 4,197,136 and 4,145,200, for example, such fibers are not expected to exhibit the very low-losses and high bandwidth which can be achieved by fibers formed by a CVD process.

A hybrid technique is disclosed in U.K. Patent application GB 2,023,127 A (equivalent to U.S. Pat. No. 4,249,925). A glass rod, preferably pure $SiO_2$ or $SiO_2$ doped with an oxide which modifies the refractive index, expansion coefficient or viscosity of the glass, is drawn into a fiber which is thereafter provided with one or more layers of cladding material. In one embodiment the core fiber, which has an expansion coefficient of $28 \times 10^{-7}/°$ C. is drawn through a crucible containing cladding glass having an expansion coefficient of $33 \times 10^{-7}/°$ C. This combination of core and cladding expansion coefficients results in a relatively weak fiber. In another embodiment a core fiber having an expansion coefficient of $32 \times 10^{-7}/°$ C. is coated by the flame hydrolysis process with a layer of germania silicate glass having an expansion coefficient of $25 \times 10^{-7}/°$ C., the resulting fiber being drawn through a crucible wherein it is provided with the outer cladding layer. The resultant fiber is again relatively weak. Moreover, the core-cladding interface is less than optimal, it having been formed by adding cladding glass layers to the initially formed core glass fiber.

SUMMARY OF THE INVENTION

It is therefore an object of the present invention to provide a method of making inexpensive low-loss optical waveguide fibers.

Another object of this invention is to provide a hybrid method of making optical fibers having high strength.

Briefly, the method of the present invention comprises the following steps. There is initially provided a preform comprising at least a centrally disposed region of core glass. A portion of the preform is heated and drawn into a preliminary fiber which is passed through a first crucible containing a first cladding glass having an expansion coefficient greater than that of the core glass. The resultant fiber is passed through a second crucible containing a second cladding glass having an expansion coefficient lower than that of the first cladding glass.

DESCRIPTION OF THE PREFERRED EMBODIMENT

Figures 1, 2, 3:
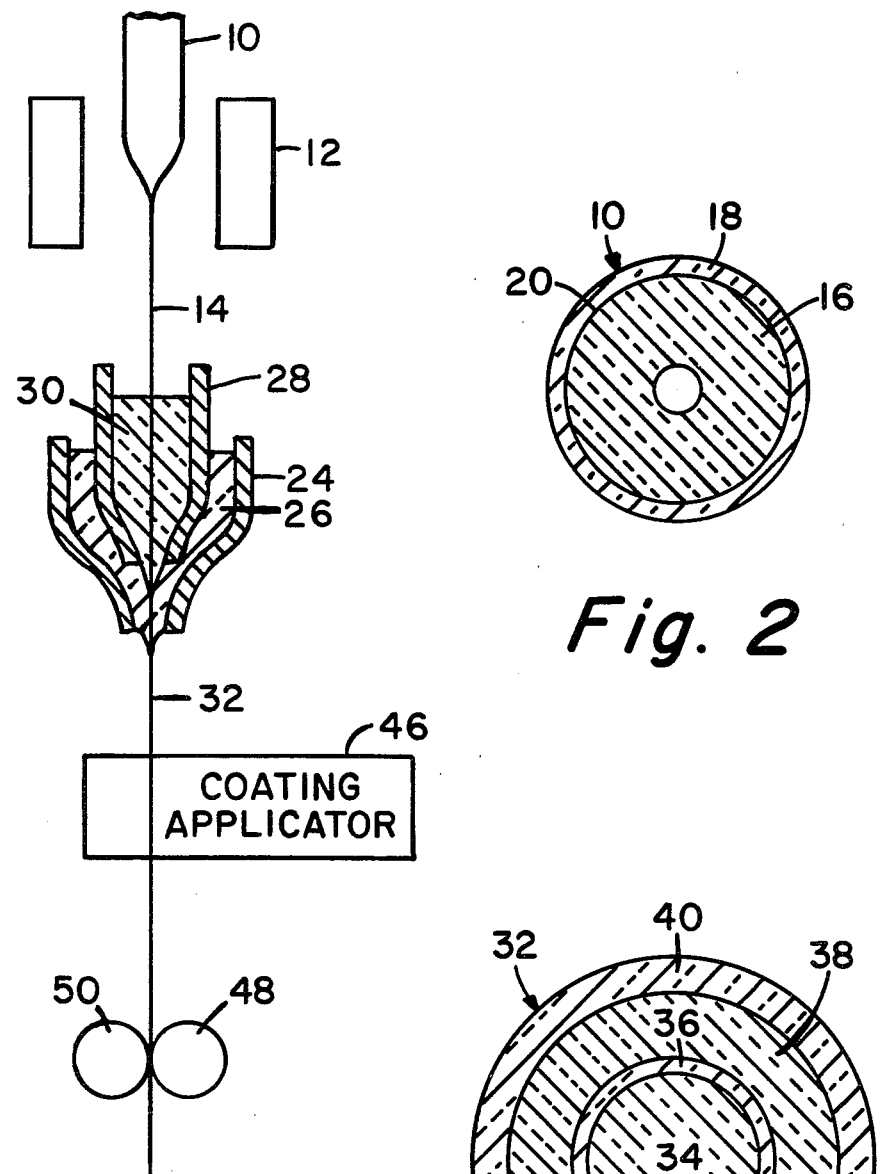
FIG. 1 is a schematic illustration of an apparatus for carrying out the method of the present invention.
FIG. 2 is a cross-sectional view of a draw blank which may be employed in the apparatus of FIG. 1.
FIG. 3 is a cross-sectional view of an optical waveguide fiber formed in accordance with the present invention.

The apparatus of the present invention is illustrated in FIG. 1. At least one end of draw blank 10 is heated by furnace 12 to a temperature sufficient to permit the drawing of preliminary fiber 14 therefrom. Because the maximum optical signal density occurs in the core, blank 10 should consist of ultra-pure glass. It is therefore formed by a CVD process such as one of those disclosed in the aforementioned references that are cited as pertaining to the CVD technique. Since the core-cladding interface of the resultant fiber must be free from light scattering centers such as bubbles and foreign particles, blank 10 should also include a thin layer 18 of cladding material which is produced by the CVD as shown in FIG. 2. Layer 18 should be sufficiently thick that interface 20 between core 16 and layer 18 remains substantially undisturbed by the additional processing steps to which fiber 14 is subjected. It is therefore preferred that the thickness of the CVD produced cladding layer in the resultant fiber be a minimum of 0.5 $\mu$m. Although blank 10 is illustrated as having a central aperture, it is noted that a number of CVD processes produce blanks which have no aperture and that such blanks can also be employed in this method.

In order to take advantage of the low-cost nature of the double-crucible process while yet retaining the high optical quality of the CVD process, preliminary fiber 14 is drawn through a crucible 24 containing a durable cladding glass 26 in the molten state. Because of the low thermal expansion coefficient of vapor-deposited high silica content glasses relative to melted glasses, the use of only a single crucible would cause the outer surface of the resultant fiber to be in a state of tension. Therefore, a double-crucible arrangement is employed, the inner crucible 28 containing a molten cladding glass having an expansion coefficient which is greater than that of outer cladding glass 26. The resultant fiber 32, which is illustrated in cross-section in FIG. 3, contains a core 34 surrounded by a thin layer 36 of cladding glass produced by a CVD technique, a layer 38 of high expansion cladding glass and an outer layer 40 of durable cladding glass having an expansion coefficient lower than that of layer 38. Fiber 32 is drawn through a conventional coating apparatus 46 by draw tractors 48 and 50. It is noted that crucibles 24 and 28 could be axially separated rather than being situated in a double-crucible arrangement as illustrated. The illustrated apparatus provides economy of space.

The following theoretical example illustrates the advantages of the present invention. The vapor deposited glass blank 10 could be formed by a flame hydrolysis technique such as that taught in U.S. Pat. No. 4,125,388. Vapors of $GeCl_4$ and $SiCl_4$ are fed to a burner which produces soot that is directed at a mandrel. After a first coating of $GeO_2$-$SiO_2$ soot is built up, the flow of $GeCl_4$ ceases and a second coating of pure $SiO_2$ soot is deposited on the first coating. The mandrel is removed and the soot preform is consolidated to form a hollow draw blank 10. The blank is inserted into furnace 12 wherein it is heated to a temperature of about 2200° C. and is drawn to reduce the diameter thereof and to cause the aperture therein to close. The draw rate and furnace temperature are controlled so that the outer diameter of preliminary fiber 14 is about 62.5 $\mu$m, the diameter of core 34 being about 50 $\mu$m. The expansion coefficient of the germania silicate core is about $12 \times 10^{-7}$/°C. Fiber 14 is threaded through the double-crucibles, and then molten glass 26 and 30 is introduced into the crucibles, each of which is heated to control the viscosity of the molten glass therein. The composition of molten glass 30 is 75.8 wt. % $SiO_2$, 10.2 wt. % CaO and 14 wt. % $Na_2O$, which has an expansion coefficient of about $90 \times 10^{-7}$/°C. Molten glass 26, which is a borosilicate glass the composition of which is 80.3 wt. % $SiO_2$, 14.6 wt. % $B_2O_3$ and 5.1 wt. % $Na_2O$, has an expansion coefficient of $33 \times 10^{-7}$/°C. The diameters of the crucible orifices, the temperatures of the crucibles and the draw rate are controlled to produce a composite fiber 32 having an outer diameter of 125 $\mu$m, the diameter of tension layer 38 being 100 $\mu$m.

Without tension layer 38, fiber 32 would be very weak, since the outer surface thereof would be in a state of tension. However, the presence of tension layer 38 creates in the outer cladding 40 a compression $\sigma$ the magnitude of which can be determined from the following equation.

$$\sigma = \frac{E \Delta T}{1 - \nu} \cdot \qquad (1)$$

$$X_1 \left(\frac{d_1}{d_3}\right)^2 \left[1 - \frac{X_2}{X_1} + \left(\frac{X_2 - X_3}{X_1}\right) \left(\frac{d_2}{d_1}\right)^2\right]$$

where the bulk modulus E in $10^7$ psi and Poisson's ratio $\nu$ is 0.2. The term $\Delta T$, which is the difference between the set point of the cladding glasses (assumed to be equal) and room temperature, is taken to be $-500°$ C. The expansion coefficients of the core glass 34, the tension layer 38 and compression layer 40 are represented by the terms $X_1$, $X_2$ and $X_3$, respectively. The terms $d_1$, $d_2$ and $d_3$ are the respective diameters of layers 36, 38 and 40. With the values given in the example above, the compression $\sigma$ is $-10$ kpsi. A compressive layer of this degree of compression would significantly improve the static fatigue of the fiber.

Since the double-crucible glasses will not directly influence the optical properties of the resultant fiber, they can be chosen to facilitate processing and to provide chemical durability on the outer surface. High purity is not required for the double-crucible glasses, and the cost of these materials is relatively low. Due to the low cost of the double-crucible glasses the thickness of layers 38 and 40 could be increased to increase the fiber diameter to 150 $\mu$m or even larger without significantly increasing the manufacturing costs of the fiber. Such a larger diameter fiber is advantageous in that it experiences reduced micro-bending loss.

To form a single mode waveguide in accordance with the method of the present invention, the diameter of core 34 should be less than 10 $\mu$m and preferably in the range of 4–10 $\mu$m, and the diameter of cladding layer 36 should be relatively large, i.e. between about 25 and 50 $\mu$m. The dimensions of layers 38 and 40 are as specified hereinabove.

I claim:
1. A method of forming an optical waveguide fiber comprising the steps of
   forming by a chemical vapor deposition technique a glass draw blank comprising a centrally disposed region of core glass surrounded by a thin layer of inner cladding glass,
   heating at least a portion of the preform and drawing therefrom a preliminary fiber,
   passing said preliminary fiber through a first crucible containing a first outer cladding glass having an expansion coefficient larger than that of said core glass and said inner cladding glass, and passing the resultant fiber through a second crucible containing a second outer cladding glass having an expansion coefficient lower than that of said first outer cladding glass.

2. A method in accordance with claim 1 wherein the steps of passing said preliminary fiber through a first crucible and passing the resultant fiber through a second crucible comprise passing said preliminary fiber through a double crucible apparatus, the inner crucible containing said first outer cladding glass and the outer crucible containing said second outer cladding glass.

3. A method in accordance with claim 2 wherein the expansion coefficient of said second outer cladding glass is greater than that of said region of core glass.

4. A method in accordance with claim 1 wherein, during the step of forming, said thin layer of inner cladding is formed in a sufficient thickness that its thickness in the resultant fiber is at least 0.5 $\mu$m.

5. A method in accordance with claim 4 wherein the steps of passing said preliminary fiber through a first crucible and passing the resultant fiber through a second crucible comprises passing said preliminary fiber through a double crucible apparatus, the inner crucible containing said first outer cladding glass and the outer crucible containing said second outer cladding glass.

6. A method in accordance with claim 5 wherein the expansion coefficient of said second outer cladding glass is greater than that of said region of core glass.

* * * * *